United States Patent
Shortt et al.

(10) Patent No.: US 11,616,569 B2
(45) Date of Patent: Mar. 28, 2023

(54) METHOD FOR ESTABLISHING A FREE-SPACE DATA TRANSMISSION CHANNEL

(71) Applicant: Airbus Defence and Space GmbH, Taufkirchen (DE)

(72) Inventors: Kevin Shortt, Taufkirchen (DE); Sergio Feo-Arenis, Taufkirchen (DE); Philipp Helle, Taufkirchen (DE); Carsten Strobel, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 17/536,050

(22) Filed: Nov. 28, 2021

(65) Prior Publication Data

US 2022/0173806 A1 Jun. 2, 2022

(30) Foreign Application Priority Data

Dec. 2, 2020 (DE) ...................... 10 2020 131 966.5

(51) Int. Cl.
*H04B 10/11* (2013.01)
*H04B 10/114* (2013.01)
(Continued)

(52) U.S. Cl.
CPC .......... *H04B 10/11* (2013.01); *H04B 10/1129* (2013.01); *H04B 10/1141* (2013.01); *H04W 40/32* (2013.01)

(58) Field of Classification Search
CPC ............................ H04B 10/11; H04B 7/18513; H04B 10/1123; H04B 7/18506; H04B 7/1851; H04B 10/503; H04B 10/1129
(Continued)

(56) References Cited

U.S. PATENT DOCUMENTS

RE44,606 E * 11/2013 Herz ..................... H04W 40/16
                                                                 455/445
9,848,419 B2 * 12/2017 Gong ..................... H04W 40/28
(Continued)

FOREIGN PATENT DOCUMENTS

EP      2 961 222 A1      12/2015
EP      2961222 A1 *     12/2015     ............. H01L 24/03
(Continued)

OTHER PUBLICATIONS

German Search Report for Application No. 102020131966 dated Dec. 11, 2021.

*Primary Examiner* — Abbas H Alagheband
(74) *Attorney, Agent, or Firm* — Jenkins, Wilson, Taylor & Hunt, P.A.

(57) ABSTRACT

A method for establishing a free-space data transmission channel between movable and/or spatially fixed network nodes. Dynamic position information is collected regarding movable network nodes and static position information relating to spatially fixed network nodes. Specific and node-dependent parameters for the fixed network nodes is collected, based on collected dynamic and static position information. A prioritization list is created of the fixed network nodes. Checking occurs, for the network node having the highest priority of the multiplicity of movable or spatially fixed network nodes in the created prioritization list, which of a selection of movable or spatially fixed network nodes are possible for setting up a directional free-space data transmission channel with the network node having the highest priority of the fixed network nodes. A directional free-space data transmission channel is set up.

6 Claims, 1 Drawing Sheet

(51) Int. Cl.
*H04B 10/112* (2013.01)
*H04W 40/32* (2009.01)

(58) Field of Classification Search
USPC .......................................... 398/118
See application file for complete search history.

(56) References Cited

U.S. PATENT DOCUMENTS

| | | | |
|---|---|---|---|
| 10,581,513 B2* | 3/2020 | Liu | H04B 10/90 |
| 10,713,956 B2* | 7/2020 | Miller | H04W 4/029 |
| 11,102,834 B2* | 8/2021 | Ross | H04W 24/04 |
| 2003/0020992 A1* | 1/2003 | Child | H04B 10/1125 |
| | | | 398/126 |
| 2010/0142447 A1* | 6/2010 | Schlicht | H04W 4/20 |
| | | | 370/328 |
| 2017/0181158 A1* | 6/2017 | Gong | H04W 64/003 |
| 2019/0043369 A1* | 2/2019 | Miller | H04W 4/029 |
| 2019/0173569 A1* | 6/2019 | Liu | H04B 7/1851 |

FOREIGN PATENT DOCUMENTS

| | | | | |
|---|---|---|---|---|
| EP | 2 803 148 B1 | 5/2019 | | |
| EP | 3 014 792 B1 | 5/2020 | | |
| EP | 3014792 B1 * | 5/2020 | ......... | H04B 10/1129 |
| EP | 3584958 B1 * | 10/2020 | ........... | G05D 1/0094 |

\* cited by examiner

METHOD FOR ESTABLISHING A FREE-SPACE DATA TRANSMISSION CHANNEL

CROSS-REFERENCE TO RELATED APPLICATION

This application claims priority to German Patent Application No. DE 10 2020 131 966.5 filed Dec. 2, 2020, the entire disclosure of which is incorporated by reference herein.

TECHNICAL FIELD

The disclosure herein relates to a method for establishing free-space data transmission channels, in particular in connection with setting up and maintaining directional communication networks in air-to-ground mobile communication.

BACKGROUND

Conventional air-to-ground mobile communication is based on communication channels which are based on non-directional, that is to say omnidirectional, radio-frequency (RF) communication. The practices of setting up and maintaining networks for air-to-ground mobile communication are likewise based on techniques which are used for omnidirectional RF communication.

The inclusion of free-space optical communication (FSOC), also called free-space optical data transmission, in air-to-ground networks makes it possible to expand ground-based backbone fiber networks to aircraft and spacecraft. The integration of FSOC technologies in the European Aviation Network (EAN) enables unprecedented connectivity for all those involved in the entire aviation industry. Operating processes developed for FSOC applications may likewise be applied to satellite communication for GEO and LEO architectures.

Closely networked RF communication networks are also referred to as mesh networks. The connectivity between individual network nodes in a mesh network is very high, and so the reliability and availability of the mesh network are particularly high. Because of the higher frequency of the carrier waves in comparison with RF communication, mesh networks which are based on FSOC ensure considerably higher data rates and a lower susceptibility to interference caused by multi-path propagation and echoes. In addition, many frequency bands are available in the optical frequency range.

Optical communication networks in the form of mesh networks are generally composed of a set of direct point-to-point connections. In order to increase the resilience of the mesh network, it is desirable to stabilize the setup of the individual FSOC network connections and to thereby improve the availability of the mesh network. Such optical communication networks which connect movable network nodes to one another have a deterministic nature, on the one hand, because of the direct, directional point-to-point connections. However, on the other hand, it is necessary to determine the exact position of the movable network nodes in order to be able to actually establish directional point-to-point connections in a useful manner.

The data throughput of the data communicated via directional point-to-point connections is considerably higher in optical communication networks than in the case of omnidirectional RF connections, with the result that even minor temporary interruptions in the point-to-point connections would result in very high potential data losses.

The document EP 3 014 792 B1 discloses a method for implementing an adaptive free-space optical network having a dynamic mesh topology with high connectivity.

SUMMARY

One of the objects of the disclosure herein therefore involves finding solutions for the planning, design, maintenance, coordination and optimization of directional communication connections in high-bandwidth networks.

This and other objects are achieved by a method disclosed herein.

According to a first aspect of the disclosure herein, a method for establishing a free-space data transmission channel between a movable network node and a spatially fixed network node comprises the steps of collecting dynamic position information relating to a multiplicity of movable network nodes and static position information relating to a multiplicity of spatially fixed network nodes, calculating specific and node-dependent parameters for each of the movable or spatially fixed network nodes, which are relevant to setting up and maintaining directional point-to-point connections, on the basis of the collected dynamic and static position information, creating a prioritization list of the multiplicity of movable or spatially fixed network nodes on the basis of the determined node-dependent parameters, checking, for the network node having the highest priority of the multiplicity of movable or spatially fixed network nodes in the created prioritization list, which of a selection of movable or spatially fixed network nodes are possible for setting up a directional free-space data transmission channel with the network node having the highest priority of the multiplicity of movable or spatially fixed network nodes, and setting up a directional free-space data transmission channel between one of the possible network nodes in the selection of movable or spatially fixed network nodes and the network node having the highest priority of the multiplicity of movable or spatially fixed network nodes.

An important idea of the disclosure herein involves finding solutions for the planning, design, maintenance, coordination and optimization of directional, in particular optical, communication connections in high-bandwidth networks composed of a heterogeneous mixture of stationary and mobile network nodes, for instance ships, trains, cars, aircraft, spacecraft or satellites. These solutions are used to set up a cohesive communication network which can be used as an expansion of existing stationery photonic networks.

One of the advantages of the method according to the disclosure herein is that the reliability, redundancy and failure safety of directional free-space data transmission communication networks can be increased, which can give rise to excellent improvements, in particular in the case of data transmissions with a very high bandwidth in dynamic network environments.

According to some embodiments of the method according to the disclosure herein, the node-dependent parameters may comprise present or expected operating states of already existing data transmission connections to ground-based communication networks, network prioritization, data backlog and/or weather data from the environment of the movable network nodes.

According to some further embodiments of the method according to the disclosure herein, the position information may be collected via a dedicated device in a ground-based communication network.

According to some further embodiments of the method according to the disclosure herein, the dynamic position information relating to a multiplicity of movable network nodes may be stored in a database of dynamic position data relating to the multiplicity of movable network nodes and may be continuously updated.

According to some further embodiments of the method according to the disclosure herein, the checking and setting-up steps may be repeated for the network node having the highest priority of the multiplicity of movable or spatially fixed network nodes in order to establish one or more redundant free-space data transmission channels with others of the possible network nodes in the selection of movable or spatially fixed network nodes.

According to some further embodiments of the method according to the disclosure herein, for a network node in the selection of network nodes which is possible after checking for setting up a directional free-space data transmission channel with the network node having the highest priority of the multiplicity of movable or spatially fixed network nodes, existing directional free-space data transmission connections may be capped in order to provide connection capacities for the network node having the highest priority of the multiplicity of movable or spatially fixed network nodes.

The above configurations and developments can be combined with one another in any desired manner, if useful. Further possible configurations, developments and implementations of the disclosure herein also comprise not explicitly mentioned combinations of features of the disclosure herein described above or below with respect to the example embodiments. In particular, a person skilled in the art will also in this case add individual aspects as improvements or additions to the respective basic form of the disclosure herein.

BRIEF DESCRIPTION OF THE DRAWINGS

The disclosure herein is explained in more detail below on the basis of the example embodiments indicated in the schematic figures, in which.

Figure 1:
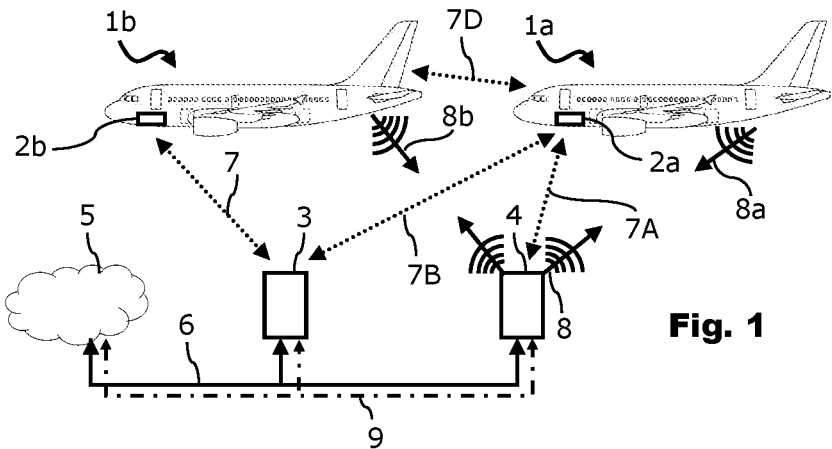
FIG. 1 shows a schematic illustration of an example air-to-ground network topology according to one embodiment of the disclosure herein.

The accompanying figures are intended to convey a further understanding of the embodiments of the disclosure herein. They illustrate embodiments and are used, in conjunction with the description, to explain principles and concepts of the disclosure herein. Other embodiments and many of the advantages mentioned are evident with regard to the drawings. The elements in the drawings are not necessarily shown in a manner true to scale with respect to one another. Direction-indicating terminology, for instance "at the top", "at the bottom", "on the left", "on the right", "above", "below", "horizontal", "vertical", "at the front", "at the rear" and similar statements are used only for explanatory purposes and are not used to restrict the generality to specific configurations as shown in the figures.

In the figures of the drawing, identical, functionally identical and identically acting elements, features and components are each provided with the same reference signs, unless stated otherwise.

DETAILED DESCRIPTION

Directional free-space data transmission is based on data transmission using unguided, directional electromagnetic waves, for example radar waves, microwaves or light. As a special case, free-space optical data transmission ("free space optical communication", FSOC) is based on data transmission using unguided, directional electromagnetic waves in the visible, infrared or ultraviolet frequency range. In this case, the transmitted data signals can be received by a receiver at distances of up to several hundred kilometers. Free-space optical data transmission is similar to directional radio insofar as similar physical active principles come into effect during the propagation of electromagnetic waves used for directional radio. Data transmission rates of up to 100 Gbit/s can be achieved with FSOC.

In typical optical communication networks having permanently installed, that is to say spatially immovable, network nodes, for instance fiber optic networks or RF backhaul networks, data traffic takes place between precisely defined points within the network. Since these points do not change in relation to one another, the network is completely deterministic, with the result that any data traffic can be reliably forwarded in a predictable and plannable manner at any time. If one of the point-to-point connections is interrupted, there are deterministic solutions for nevertheless forwarding the data traffic to each point of the network while excluding the interrupted connection.

In directional communication networks having a heterogeneous mixture of stationary and mobile network nodes, this determinism partially disappears—in order to be able to reliably maintain directional, and in particular optical, communication connections as directional point-to-point connections at any time, there is a need for advanced solutions which are able to accordingly take into account dynamically changing network configurations in the dynamic connection planning. This is all the more important, the higher the available bandwidth of the point-to-point connections of the network since the potential data losses increase with increasing data rate while the duration of a potential connection failure remains the same.

FIG. 1 shows a schematic illustration of an example air-to-ground network topology in which movable network nodes—illustrated here, by way of example, as aircraft 1a and 1b—are connected to spatially fixed network nodes—illustrated here, by way of example, as land-based communication towers or ground stations 3 and 4—via directional point-to-point connections. Furthermore, the movable network nodes may also establish directional communication connections between one another.

Each movable network node 1a and 1b respectively has a flat optical communication terminal having one or more communication terminal devices 2a and 2b. In the case of aircraft, the respective communication terminal device 2a or 2b may be mounted on an outer surface of the aircraft, for example on a part of the fuselage underside. The communication terminal device may be designed in such a manner that it substantially does not project from the plane of the outer surface of the aircraft on which it is mounted, thus reducing any additional air resistance which would otherwise be produced by the communication terminal device.

The communication terminal devices 2a and 2b may be, for example, optical communication terminal devices 2a and 2b and may be configured in such a manner that they can communicate with one or more ground stations 3 and 4 via a free-space optical communication connection 7A, 7B, 7C. In particular, it is possible to maintain more than one free-space optical communication connection to various stations of the ground stations 3 and 4, thus enabling a transfer method of the movable network nodes 1a and 1b between various adjacent ground stations 3 and 4. In this manner, all communication networks of the movable network node 1a and 1b can remain connected to the same ground-based communication network 5, to which the ground stations 3 and 4 are also connected. In particular, the ground-based communication network 5 may be based on fiber optic networks 6, that is to say it may be wired or connected using optical waveguides, in contrast to the wireless free-space optical communication connections 7A, 7B, 7C. The free-space optical communication connections 7A, 7B, 7C may make it possible to interchange data between an aircraft network and the ground-based communication network 6.

In addition to the directional free-space communication connections, it is possible to also maintain omnidirectional, that is to say non-directional, communication connections 8, 8a, 8b, for example satellite-based or cellular mobile radio connections, for instance an LTE-based "air-to-ground" network (A2G), or radar-based communication connections, for instance Automatic Dependent Surveillance—Broadcast (ADS-B), between the spatially fixed network nodes 3 and 4 and the movable network nodes 1a and 1b. For this purpose, appropriate communication terminal devices for non-directional communication can be installed both in the spatially fixed network nodes 3 and 4 and in the movable network nodes 1a and 1b and can be operated in a conventional manner. Accordingly, the backbone network 9 for forwarding the data transmitted via the non-directional communication connections 8, 8a, 8b between the ground-based communication network 5 and the respective ground stations 3 and 4 can also be configured in a conventional manner.

Figure 2:
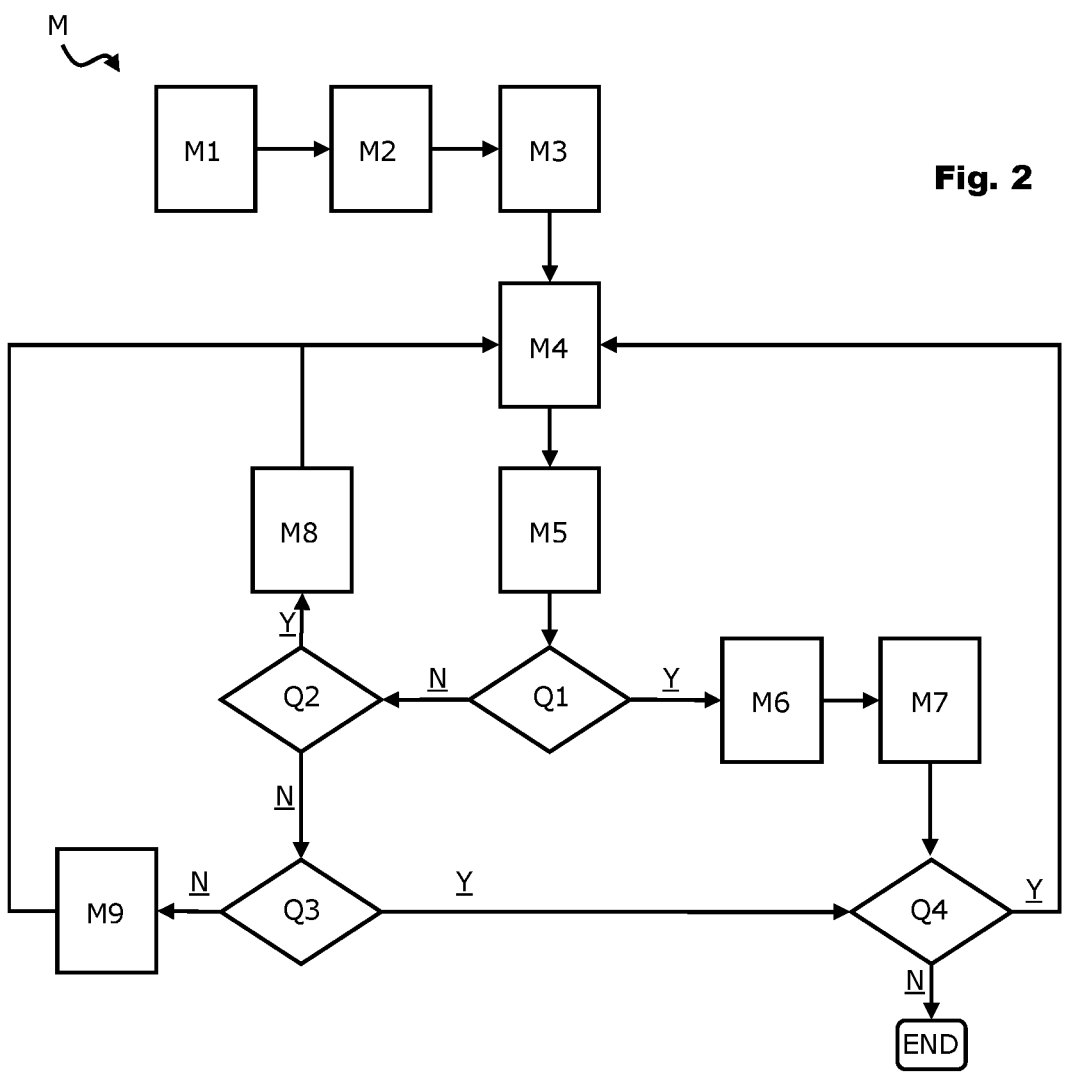
FIG. 2 shows an abstracted flowchart of an example method for establishing a directional free-space data transmission channel between movable and/or spatially fixed network nodes according to a further embodiment of the disclosure herein.

FIG. 2 shows an abstracted flowchart of an example method M for establishing a directional free-space data transmission channel between a movable or spatially fixed network node, for example a directional, in particular optical, free-space communication connection 7A, 7B, 7C between one of the movable network nodes 1a and 1b and one of the spatially fixed network nodes 3 and 4, as illustrated and explained in connection with FIG. 1. The method M can be used as a basis for a node-centred set-up model of a directional, in particular optical, free-space communication network, in particular for setting up a high-bandwidth communication network in air-to-ground mobile communication between ground stations and aircraft, spacecraft and/or satellites. The text below refers to the practice of establishing free-space optical communication transmission channels for the example illustration of the method M, but any type of directional free-space communication connections, for instance based on radar waves or microwaves, is likewise possible.

In a first step M1, information relating to positions, movement data and calculated or predicted trajectories of all or at least some movable network nodes 1a, 1b is collected and combined at a central location in a database. This information comprises, in particular, dynamic position information since the local coordinates of the movable network nodes 1a, 1b always change or can change. Static position information relating to a multiplicity of spatially fixed network nodes 3 and 4 may likewise be collected. The static position information corresponds almost to position information having a speed of movement and acceleration of zero. The information can be collected via a dedicated device in the ground-based communication network 5. This information can be collected, for example, using a sliding window function for a particular period in the past and/or a particular period in the future and can be updated continuously, that is to say at defined intervals of time. The information can be collected, for example, using omnidirectional, that is to say non-directional, communication connections 8a, 8b, via which the ground-based communication network 5 is already connected to the movable network nodes 1a, 1b anyway.

The database containing dynamic position data relating to the movable network nodes 1a, 1b is used as a basis for the calculation or determination of specific and node-dependent parameters or performance features, which are relevant to setting up and maintaining directional point-to-point connections, as carried out in step M2. Examples of the node-dependent parameters or performance features are a predicted duration of the proximity to various ground stations, the current or expected operating state of already existing data transmission connections to ground-based communication networks (availability, reliability, latency, number, QoS, bandwidth, frequency range etc.), network prioritization, data backlog, weather data from the environment of the movable network nodes 1a, 1b or similar node properties relevant to communication.

In step M3, a prioritization list is then created on the basis of the determined node-dependent parameters or performance features. This prioritization list may sort the available movable and spatially fixed network nodes 1a, 1b, 3, 4 according to the urgency of the network connection to a ground-based communication network 5, for example. Other sorting criteria may alternatively or additionally likewise be taken into account, for instance expected number of available ground stations in the vicinity of the movable and spatially fixed network nodes 1a, 1b, 3, 4 to be connected or the predicted communication connection status in a particular period in the future.

In step M4, one of the movable and spatially fixed network nodes 1a, 1b, 3, 4 to be connected in the prioritization list is selected as the first step of a process loop which possibly needs to be run through several times depending on the number of movable and spatially fixed network nodes 1a, 1b, 3, 4 and other available network nodes. In particular, the movable or spatially fixed network node 1a, 1b, 3, 4 having the highest priority of the network nodes currently in the prioritization list can be selected.

In a subsequent step M5, a check is carried out in order to determine which of a selection of movable or spatially fixed network nodes—for instance the ground stations 3, 4 of the ground-based communication network 5—are possible for setting up a free-space optical data transmission channel, that is to say which of the movable or spatially fixed network nodes 1a, 1b, 3, 4 have a sufficient line-of-sight connection to the selected movable or spatially fixed network node 1a, 1b, 3, 4 with respect to distance and freedom from obstacles. In a decision-making or branching step Q1, a check is carried out in order to determine whether one of the movable or spatially fixed network nodes 1a, 1b, 3, 4 which are possible after the check in step M5 has current free capacities for setting up a free-space optical data transmission channel. If this is the case, a connection request is transmitted in step M6 from the selected free network node to the selected movable or spatially fixed network node, for example via omnidirectional, that is to say non-directional, communication connections 8, 8a, 8b, via which the selected free network node is connected to the relevant movable or spatially fixed network node. If the connection set-up was successful, that is to say if the selected free network node has successfully negotiated the corresponding connection set-up parameters with the relevant movable or spatially fixed network node, the network node which is now connected to the ground-based communication network 5 via a free-space optical data transmission channel can be removed from the prioritization list in step M7. In a further branching step Q4, a check is then carried out in order to determine whether yet further network nodes are actually free. If this is the case, the process loop can be run through again starting with step M4 for setting up further, possibly redundant free-space optical data transmission channels with other free network nodes or ground stations. Alternatively, the method M is aborted after the branching step Q4 (or alternatively run through again from step M4 with the next-ranking network node in the prioritization list).

However, if it is determined in the branching step Q1 that none of the network nodes 1a, 1b, 3, 4 possible after the check in step M5 has current free capacities for setting up a free-space optical data transmission channel or that no network node 1a, 1b, 3, 4 at all is possible, a check is carried out in a branching step Q2 in order to determine whether yet further network nodes are actually free. If this is the case, the network node is first of all removed from the prioritization list or is alternatively deferred in the prioritization list and the process loop starting with step M4 is run through again with the next-ranking network node in the prioritization list.

However, if no further network nodes at all are free, a check is carried out in order to determine whether there is fundamentally a data connection between the ground-based communication network 5 and one of the movable network nodes 1a, 1b. If this is the case, the method M can be aborted via the branching step Q4. However, if no network nodes are currently available and there is also no data connection between the ground-based communication network 5 and one of the movable network nodes 1a, 1b, it is necessary to provide the corresponding resources for establishing such a data connection. For this purpose, in step M9—in a similar manner to step M5—a selection of the network nodes 1a, 1b, 3, 4 possible for setting up a free-space optical data transmission channel is determined for the movable or spatially fixed network node currently having the highest priority. One of these network nodes 1a, 1b, 3, 4 is selected in step M9 and one of the free-space optical data transmission connections which exist for the selected network node is capped in order to provide corresponding capacities for setting up a free-space optical data transmission connection to the currently selected movable network node 1a, 1b so that this network node can be actually connected to the ground-based communication network 5.

In the detailed description above, various features have been combined in one or more examples for the purpose of improving the rigorousness of the description. However, it should be clear in this case that the above description is only of an illustrative nature but is in no way of a restrictive nature. It is used to cover all alternatives, modifications and equivalents of the various features and example embodiments. Many other examples will be immediately and directly clear to a person skilled in the art on the basis of his technical knowledge in view of the above description.

The example embodiments were selected and described in order to be able to illustrate the principles underlying the disclosure herein and their possible uses in practice in the best possible manner. As a result, experts can optimally modify and use the disclosure herein and its various example embodiments with respect to the intended use. In the claims and the description, the terms "containing" and "having" are used as neutral linguistic concepts for the corresponding term "comprising".

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for establishing a directional free-space data transmission channel between movable or spatially fixed network nodes, comprising:
    collecting dynamic position information relating to a multiplicity of movable network nodes and static position information relating to a multiplicity of spatially fixed network nodes in communication with a ground-based communication network;
    calculating specific and node-dependent parameters for each of the movable or spatially fixed network nodes, which are relevant to setting up and maintaining data transmission connections to the ground-based communication network via directional point-to-point connections, on a basis of the collected dynamic and static position information;
    creating a prioritization list of the multiplicity of movable or spatially fixed network nodes according to an urgency of network connection to the ground-based communication network on a basis of the determined node-dependent parameters;
    for a network node having a highest priority of the multiplicity of movable or spatially fixed network nodes in the created prioritization list, checking which of a selection of movable or spatially fixed network nodes are possible for setting up a directional free-space data transmission channel with the network node having the highest priority of the multiplicity of movable or spatially fixed network nodes;

setting up a directional free-space data transmission channel between one of the possible network nodes in the selection of movable or spatially fixed network nodes and the network node having the highest priority of the multiplicity of movable or spatially fixed network nodes.

2. The method according to claim 1, wherein the node-dependent parameters comprise present or expected operating states of already existing data transmission connections to the ground-based communication network, network prioritization, data backlog and/or weather data from an environment of the movable network nodes.

3. The method according to claim 1, wherein the position information is collected via a dedicated device in the ground-based communication network.

4. The method according to claim 1, wherein the dynamic position information relating to a multiplicity of movable network nodes is stored in a database of dynamic position data relating to the multiplicity of movable network nodes and is continuously updated.

5. A method for establishing a directional free-space data transmission channel between movable or spatially fixed network nodes, comprising:

collecting dynamic position information relating to a multiplicity of movable network nodes and static position information relating to a multiplicity of spatially fixed network nodes;

calculating specific and node-dependent parameters for each of the movable or spatially fixed network nodes, which are relevant to setting up and maintaining directional point-to-point connections, on a basis of the collected dynamic and static position information;

creating a prioritization list of the multiplicity of movable or spatially fixed network nodes on a basis of the determined node-dependent parameters;

for a network node having a highest priority of the multiplicity of movable or spatially fixed network nodes in the created prioritization list, checking which of a selection of movable or spatially fixed network nodes are possible for setting up a directional free-space data transmission channel with the network node having the highest priority of the multiplicity of movable or spatially fixed network nodes; and setting up a directional free-space data transmission channel between one of the possible network nodes in the selection of movable or spatially fixed network nodes and the network node having the highest priority of the multiplicity of movable or spatially fixed network nodes;

wherein the checking and the setting-up steps are repeated for the network node having the highest priority of the multiplicity of movable or spatially fixed network nodes to establish one or more redundant free-space data transmission channels with others of the possible network nodes in the selection of movable or spatially fixed network nodes.

6. A method for establishing a directional free-space data transmission channel between movable or spatially fixed network nodes, comprising:

collecting dynamic position information relating to a multiplicity of movable network nodes and static position information relating to a multiplicity of spatially fixed network nodes;

calculating specific and node-dependent parameters for each of the movable or spatially fixed network nodes, which are relevant to setting up and maintaining directional point-to-point connections, on a basis of the collected dynamic and static position information;

creating a prioritization list of the multiplicity of movable or spatially fixed network nodes on a basis of the determined node-dependent parameters;

for a network node having a highest priority of the multiplicity of movable or spatially fixed network nodes in the created prioritization list, checking which of a selection of movable or spatially fixed network nodes are possible for setting up a directional free-space data transmission channel with the network node having the highest priority of the multiplicity of movable or spatially fixed network nodes;

setting up a directional free-space data transmission channel between one of the possible network nodes in the selection of movable or spatially fixed network nodes and the network node having the highest priority of the multiplicity of movable or spatially fixed network nodes;

wherein, for a network node in the selection of network nodes which is possible after checking for setting up a directional free-space data transmission channel with the network node having the highest priority of the multiplicity of movable or spatially fixed network nodes, existing directional free-space data transmission connections are capped to provide connection capacities for the network node having the highest priority of the multiplicity of movable or spatially fixed network nodes.

* * * * *